United States Patent
Inoue et al.

(10) Patent No.: US 8,880,305 B2
(45) Date of Patent: Nov. 4, 2014

(54) VEHICLE CONTROL APPARATUS

(71) Applicant: Fuji Jukogyo Kabushiki Kaisha, Tokyo (JP)

(72) Inventors: Koichi Inoue, Tokyo (JP); Takahiro Kinoshita, Tokyo (JP); Noriaki Tatematsu, Tokyo (JP); Hironaga Ito, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/935,367

(22) Filed: Jul. 3, 2013

(65) Prior Publication Data

US 2014/0024494 A1 Jan. 23, 2014

(30) Foreign Application Priority Data

Jul. 19, 2012 (JP) .................................. 2012-160163

(51) Int. Cl.
*B60W 10/11* (2012.01)
*F16H 61/16* (2006.01)
(Continued)

(52) U.S. Cl.
CPC ............. *B60W 10/11* (2013.01); *B60W 10/182* (2013.01); *F16H 2312/18* (2013.01); *B60W 2540/16* (2013.01); *B60W 50/035* (2013.01); *B60W 10/184* (2013.01); *B60W 50/10* (2013.01); *B60W 30/18109* (2013.01); *F16H 59/12* (2013.01); *B60W 30/18045* (2013.01); *Y10S 477/906* (2013.01)
USPC ................. 701/51; 701/53; 701/76; 477/126; 477/906; 74/483 PB

(58) Field of Classification Search
CPC ........ B60K 28/00; B60K 28/06; B60K 28/16; B60K 28/165; B60W 10/182; B60W 2040/0818; B60W 2040/0863; B60W 2540/26
USPC ............. 701/47, 51, 53, 62, 76, 97; 477/126, 477/906; 74/483 PB
See application file for complete search history.

(56) References Cited

U.S. PATENT DOCUMENTS 4,980,668 A * 12/1990 Leigh-Monstevens ....... 340/456
5,085,106 A * 2/1992 Bubnash ......................... 74/335

(Continued)

FOREIGN PATENT DOCUMENTS

| DE | 10306136 | * | 8/2004 |
| JP | 8-85359 | * | 4/1996 |
| JP | 2009-209881 A | | 9/2009 |

OTHER PUBLICATIONS

Machine translation DE10306136.*
Machine translation 8-85359.*

*Primary Examiner* — Edwin A Young
*Assistant Examiner* — Colby M Hansen
(74) *Attorney, Agent, or Firm* — McGinn IP Law Group, PLLC

(57) ABSTRACT

There is provided a vehicle control apparatus. The vehicle control apparatus includes: an automatic return type select switch that receives an operation for selecting an operating condition of an automatic transmission and outputs a selection signal corresponding to the received selection operation; a switch controller that switches the operating condition of the automatic transmission in accordance with the selection signal output by the select switch; an emergency determining unit that determines whether or not the select switch has been operated consecutively at least a predetermined number of times within a predetermined period while the vehicle travels, and outputs an emergency operation signal when determining that the select switch has been operated consecutively; and a brake control unit and an electric parking brake control unit that apply braking to the vehicle on the basis of an operation by a driver and the emergency operation signal output by the emergency determining unit.

5 Claims, 5 Drawing Sheets

(51) Int. Cl.
*G05G 11/00* (2006.01)
*B60W 10/18* (2012.01)
*B60W 50/035* (2012.01)
*B60W 10/184* (2012.01)
*B60W 50/10* (2012.01)
*B60W 30/18* (2012.01)
*F16H 59/12* (2006.01)

(56) References Cited

U.S. PATENT DOCUMENTS

| | | | |
|---|---|---|---|
| 5,827,149 A * | 10/1998 | Sponable | 477/92 |
| 6,253,138 B1 * | 6/2001 | Shober et al. | 701/51 |
| 2006/0041345 A1 * | 2/2006 | Metcalf | 701/33 |
| 2008/0064375 A1 * | 3/2008 | Gottlieb | 455/414.1 |

* cited by examiner

VEHICLE CONTROL APPARATUS

CROSS-REFERENCE TO RELATED APPLICATIONS

The present application claims priority from Japanese Patent Application No. 2012-160163, filed on Jul. 19, 2012, the entire contents of which are hereby incorporated by reference.

BACKGROUND OF THE INVENTION

1. Field of the Invention

The present invention relates to a vehicle control apparatus, and more particularly to a vehicle control apparatus for a vehicle installed with an automatic transmission having an inhibit function.

2. Description of the Related Art

A conventional automatic transmission installed in a vehicle employs a reverse inhibit function. When a select lever is operated to a reverse (R) range during forward travel, the reverse inhibit function determines an erroneous operation by a driver or the like and prohibits a switch to a reverse condition. The reverse inhibit function is used to prevent shock, engine stalling, a reduction in a durability of the automatic transmission, and so on, which occur when the automatic transmission is switched to the reverse condition during forward travel (in other words, when the automatic transmission is switched to a condition in which power is transmitted in an opposite direction to an advancement direction of the vehicle) due to an erroneous operation or a misunderstanding by the driver.

Japanese Unexamined Patent Application Publication (JP-A) No. 2009-209881 discloses a vehicle control apparatus that interrupts power transmission by an automatic transmission when a vehicle speed is higher than a threshold and a shift position is either switched to a reverse (R) position during forward travel or switched to a forward (D) position during reverse travel.

For example, when the shift position is switched to the reverse (R) position during travel in the forward (D) position and the vehicle speed is higher than V1, the vehicle control apparatus executes reverse inhibit control to set the automatic transmission in a neutral (N) condition. The vehicle control apparatus stops the reverse inhibit control when the vehicle speed falls below V1. Further, when idle-up is required following stoppage of the reverse inhibit control, the vehicle control apparatus outputs a control signal for increasing a throttle opening to an electronic throttle valve as an idle up request signal. According to this vehicle control apparatus, convenience during creeping can be improved while avoiding engine stalling during a return from the inhibit control.

Incidentally, when the driver suddenly loses consciousness or suffers leg cramps while driving, for example, or in other words in an emergency where the driver is unable to perform an appropriate brake operation, it is desirable to decelerate and stop the vehicle.

The select lever for switching the operating condition of the automatic transmission is normally disposed between a driving seat (i.e. the driver) and a front passenger seat (i.e. a passenger) in a center console of the vehicle or the like, and can therefore be operated comparatively easily even from the front passenger seat side. With the vehicle control apparatus described in JP-A No. 2009-209881, however, when the driver or the passenger operates the select lever to the reverse (R) range during an emergency with the intention of decelerating/stopping the vehicle, the automatic transmission is switched to the neutral (N) condition, and therefore the vehicle continues to travel through inertia. It is therefore impossible to decelerate and stop the vehicle quickly during an emergency.

SUMMARY OF THE INVENTION

The present invention has been designed to solve this problem, and an object thereof is to provide a vehicle control apparatus for a vehicle installed with an automatic transmission having an inhibit function, with which the vehicle can be decelerated and stopped more quickly during an emergency.

A first aspect of the present invention provides a control apparatus for a vehicle installed with an automatic transmission having an inhibit function, and includes: an automatic return type selector that receives an operation for selecting an operating condition of the automatic transmission and outputs a selection signal corresponding to the received selection operation; a switch that switches the operating condition of the automatic transmission in accordance with the selection signal output by the selector; a determining unit that determines, on the basis of the selection signal output by the selector, whether or not the selector has been operated consecutively at least a predetermined number of times within a predetermined period while the vehicle travels, and outputs an emergency operation signal when determining that the selector has been operated consecutively; and a brake unit that applies braking to the vehicle on the basis of an operation by a driver and the emergency operation signal output by the determining unit.

In this case, when the selector is operated consecutively at least the predetermined number of times within the predetermined period while the vehicle travels, the emergency operation signal is output, and on the basis of the emergency operation signal, braking is applied to the vehicle. Hence, when the selector is operated consecutively, an emergency is determined, and therefore the vehicle can be stopped by applying braking thereto automatically. As a result, the vehicle can be decelerated and stopped more quickly during an emergency. Further, in the vehicle control apparatus according to the present invention, a normal operation can be performed when the selector is operated singly, for example. Note that the inhibit function includes a reverse inhibit function for prohibiting a switch to a reverse (R) condition during forward travel and a forward inhibit function for prohibiting a switch to a drive (D) condition during reverse travel.

Preferably, the determining unit outputs the emergency operation signal when determining that an operation to select an identical operating condition, from among a plurality of operating conditions that can be selected by the selector, has been performed consecutively at least the predetermined number of times within the predetermined period.

In this case, an emergency is determined when an identical selection operation is performed repeatedly over a comparatively short period. As a result, an emergency can be determined quickly and appropriately.

Preferably, the determining unit outputs the emergency operation signal when determining that an operation to select a reverse condition has been performed consecutively at least the predetermined number of times within the predetermined period during forward travel.

In this case, an emergency is determined when an operation to select a condition in which the vehicle advances in an opposite direction (a reverse direction) to a current travel direction is performed repeatedly over a comparatively short period. Hence, a desire of the driver or the passenger to decelerate/stop the vehicle can be inferred, and as a result, an emergency can be determined quickly and accurately.

In the vehicle control apparatus according to the present invention, when the determining unit determines that the selector has been operated consecutively, the switch preferably switches the automatic transmission to a neutral condition.

In this case, the automatic transmission is switched to the neutral condition when the selector is operated consecutively while the vehicle travels, or in other words when an emergency is determined. Therefore, shock, engine stalling, a reduction in a durability of the automatic transmission, and so on, which occur when the automatic transmission is switched to a condition in which power is transmitted in an opposite direction to an advancement direction of the vehicle, for example, can be prevented.

Preferably, when the determining unit determines that the selector has been operated consecutively while the vehicle travels forward, the switch maintains the automatic transmission in a forward condition.

In this case, the automatic transmission is maintained in the forward condition when the selector is operated consecutively during forward travel, or in other words when an emergency is determined. Therefore, an engine brake can be applied during braking of the vehicle. As a result, the vehicle can be decelerated and stopped more quickly.

Preferably, when the brake unit stops the vehicle by applying braking thereto on the basis of the emergency operation signal, the switch switches the automatic transmission to a parking condition.

In so doing, unnecessary movement of the vehicle when stationary can be prevented. In other words, the vehicle can be prevented from moving even when stopped on a slope or the like, for example.

Preferably, the vehicle control apparatus further includes a display that displays a message to the driver and/or a passenger indicating that braking is underway when the brake unit applies braking to the vehicle on the basis of the emergency operation signal, in which the brake unit illuminates a brake lamp when applying braking to the vehicle on the basis of the emergency operation signal.

In this case, the message indicating that emergency braking is underway is displayed, and therefore the driver and/or the passenger can acknowledge that an emergency operation has been received. Moreover, the brake lamp is illuminated during emergency braking, and therefore a following vehicle can be made aware that braking is underway. As a result, a collision with the following vehicle can be prevented.

DESCRIPTION OF THE PREFERRED EMBODIMENTS

Figure 1:
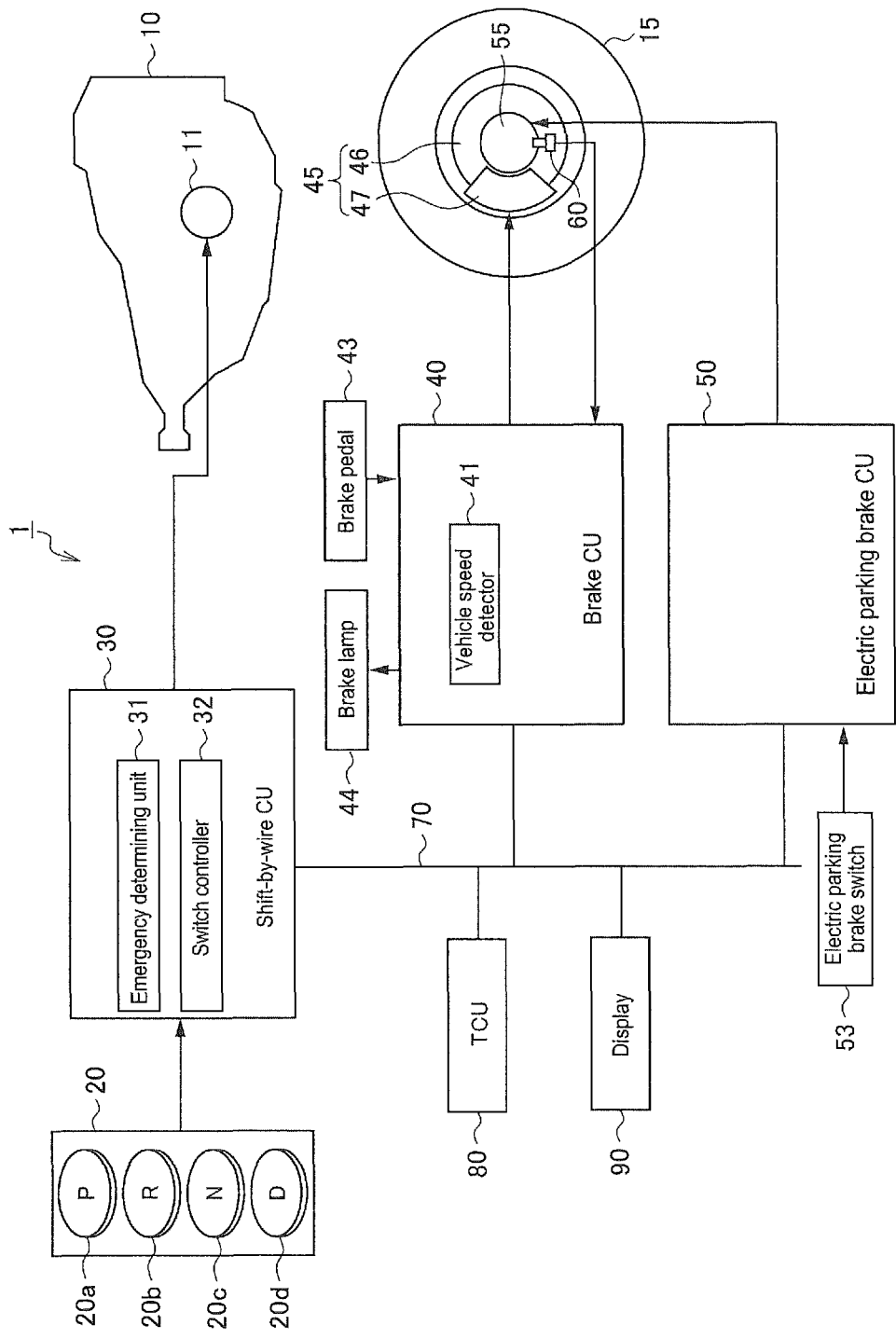
FIG. 1 is a block diagram showing a configuration of a vehicle control apparatus according to an embodiment.

A preferred embodiment of the present invention will be described in detail below with reference to the drawings. Note that in the drawings, identical reference symbols are used for identical or corresponding parts. Further, identical elements in the respective drawings have been allocated identical reference symbols, and duplicate description thereof has been omitted.

First, using FIG. 1, a configuration of a vehicle control apparatus 1 according to this embodiment will be described. FIG. 1 is a block diagram showing the configuration of the vehicle control apparatus 1.

The vehicle control apparatus 1 is provided in a vehicle installed with a shift-by-wire automatic transmission 10 having an inhibit function. The vehicle control apparatus 1 has a function for executing reverse inhibit control when an operation to select a reverse (R) range is performed singly during forward travel, and a function for determining an emergency and performing automatic braking when the operation to select the reverse (R) range is performed a plurality of times within a short period, or in other words performed consecutively.

For this purpose, the vehicle control apparatus 1 mainly includes a select switch 20 that receives an operation for selecting an operating condition (a range) of the automatic transmission 10, a shift-by-wire control unit (to be referred to hereafter as a "shift-by-wire CU") 30 that determines whether or not an emergency has occurred on the basis of the selection operation received by the select switch 20 and switches the operating condition of the automatic transmission 10 by driving a shift-by-wire actuator 11, and a brake control unit (to be referred to hereafter as a "brake CU") 40 and an electric parking brake control unit (to be referred to hereafter as an "electric parking brake CU") 50 that apply braking to a vehicle wheel 15 in response to an operation by a driver and an emergency operation signal output by the shift-by-wire CU 30. Each of these constituent elements will be described in detail below.

The automatic transmission 10 is connected to an output shaft of an engine (not shown) in order to convert and output a driving force from the engine. The automatic transmission 10 is a stepped automatic transmission that includes a torque converter having a clutch function and a torque amplification function and a transmission unit having a shift gear train and a control valve (a valve body), and is configured to be capable of automatic gear shifting using the control valve. Another transmission such as a continuously variable transmission (CVT) employing a chain system or the like, for example, may also be used as the automatic transmission 10. The driving force input from the engine is converted by the automatic transmission 10 and then transmitted from an output shaft of the automatic transmission 10 to the vehicle wheel 15 of the vehicle via a differential gear, a drive shaft, and so on (not shown). Note that FIG. 1 shows only one vehicle wheel 15 of four vehicle wheels attached to the vehicle, and the other vehicle wheels have been omitted from the drawing.

The shift-by-wire actuator 11 is electrically connected to the shift-by-wire CU 30 of the automatic transmission 10 in order to switch the operating condition (the range) of the automatic transmission 10 in response to a control signal (a drive signal) from the shift-by-wire CU 30. Note that the shift-by-wire CU 30 and the shift-by-wire actuator 11 may be formed integrally. An electric motor, for example, may be used favorably as the shift-by-wire actuator 11.

The shift-by-wire actuator 11 switches the operating condition of the automatic transmission 10 by operating a manual valve constituting the control valve of the automatic transmission 10 in response to the control signal from the shift-by-wire CU 30. Here, the automatic transmission 10 is configured to be capable of obtaining four operating conditions, namely a parking condition (a parking (P) range), a reverse condition (a reverse (R) range), a neutral condition (a neutral (N) range), and a forward condition (a drive (D) range).

Further, the select switch 20 is disposed in a center console or the like of the vehicle, for example, in order to receive an operation performed by a driver or the like to select the operating condition (the range) of the automatic transmission 10 and output a selection signal corresponding to the received selection operation. The select switch 20 includes four switches, for example, namely a parking (P) switch 20a for selecting the parking condition (the P range), a reverse (R) switch 20b for selecting the reverse condition (the R range), a neutral (N) switch 20c for selecting the neutral condition (the N range), and a drive (D) switch 20d for selecting the forward condition (the D range). These four switches 20a to 20d are respectively constituted by automatic return switches (momentary switches) that remain in an ON condition only when pressed by a finger or the like and return to an OFF condition when the finger or the like is removed.

The select switch 20 is electrically connected to the shift-by-wire CU 30 in order to output a selection signal (selection information) corresponding to the pressed switch to the shift-by-wire CU 30. In other words, the select switch 20 functions as a selector. Note that a lever type selection mechanism may be used instead of the select switch 20. In this case, however, an automatic return type (momentary type) select lever that returns to a home position following a lever operation is preferably used so that consecutive requests (to be described in detail below) by the driver or the like can be detected.

The shift-by-wire CU 30 is electrically connected to the shift-by-wire actuator 11 and the select switch 20. Further, the shift-by-wire CU 30 is connected communicably to the brake CU 40, the electric parking brake CU 50, and so on via an in-vehicle communication line such as a controller area network (CAN) 70 or the like, for example.

The shift-by-wire CU 30 determines whether or not an emergency has occurred on the basis of the selection signal (selection information) from the select switch 20, and when conditions are normal, outputs a control signal (a motor drive signal) corresponding to the selection signal from the select switch 20 to the shift-by-wire actuator 11. During an emergency, on the other hand, the shift-by-wire CU 30 outputs a control signal (a motor drive signal) to the shift-by-wire actuator 11 to switch the automatic transmission 10 to the neutral (N) condition and issues a brake request by outputting an emergency operation signal to the brake CU 40 and the electric parking brake CU 50.

For this purpose, the shift-by-wire CU 30 includes functions of an emergency determining unit 31 and a switch controller 32. The shift-by-wire CU 30 is constituted by a microprocessor that performs calculations, a ROM storing a program and so on for causing the microprocessor to execute various types of processing, a RAM storing various data such as calculation results, a backup RAM whose stored content is maintained by a 12 V battery, an input/output I/F, and so on. Respective functions of the emergency determining unit 31 and the switch controller 32 are realized in the shift-by-wire CU 30 by having the microprocessor execute the program stored in the ROM.

The emergency determining unit 31 determines whether or not the select switch 20 has been operated consecutively at least a predetermined number of times within a predetermined period (at least five times in two seconds, for example) during vehicle travel. When determining that the select switch 20 has been operated consecutively, the emergency determining unit 31 determines that an emergency has occurred, and outputs the emergency operation signal. At this time, the emergency determining unit 31 preferably outputs the emergency operation signal when determining that an operation for selecting an identical operating condition (range), from among the four operating conditions (ranges) that can be selected by the select switch 20, has been performed at least five consecutive times within two seconds, for example (in other words, when a single switch from the parking switch 20a, the reverse switch 20b, the neutral switch 20c, and the drive switch 20d constituting the select switch 20 is pressed consecutively).

In this embodiment in particular, the emergency determining unit 31 is configured to determine that an emergency has occurred and output the emergency operation signal when determining that the reverse switch 20b has been pressed at least five consecutive times within two seconds, for example. Note that the switch for determining an emergency is not limited to the reverse switch 20b, and may be set as desired. For example, the parking switch 20a may be used instead of or in addition to the reverse switch 20b. Further, an emergency may be determined using all of the switches 20a to 20d, including the neutral switch 20c and the drive switch 20d. Note that the predetermined period and the predetermined number of times described above may also be set as desired, but are preferably set at a numerical value ensuring that erroneous determinations from normal operations are avoided. Hence, the emergency determining unit 31 functions as a determining unit. A determination result generated by the emergency determining unit 31 is output to the switch controller 32. Further, the emergency operation signal is output to the brake CU 40 and the electric parking brake CU 50 via the CAN 70.

When an emergency is determined by the emergency determining unit 31, the switch controller 32 outputs a control signal (a motor driving signal) for switching the automatic transmission 10 to the neutral (N) condition to the shift-by-wire actuator 11. In a case where an emergency is determined using the drive switch 20d, for example, the automatic transmission 10 is switched to the neutral (N) condition when an emergency is determined in response to consecutive operations of the drive switch 20d during forward travel. Further, in a case where braking is applied to the vehicle by the brake CU 40 and the electric parking brake CU 50 on the basis of the emergency operation signal in order to stop the vehicle, the switch controller 32 drives the shift-by-wire actuator 11 to switch the automatic transmission 10 to the parking condition. In other words, the switch controller 32 and the shift-by-wire actuator 11 function as a switch.

When an emergency is not determined by the emergency determining unit 31 (i.e. under normal conditions), on the other hand, the switch controller 32 outputs a control signal (a motor driving signal) corresponding to the selection signal from the select switch 20 to the shift-by-wire actuator 11 in order to drive the shift-by-wire actuator 11 to switch the operating condition of the automatic transmission 10. Further, when an emergency has not been determined by the emergency determining unit 31 and an operation is performed in an opposite direction to an advancement direction, the switch controller 32 executes inhibit control to cancel the operation (to switch to the N range, for example).

The brake CU 40 applies braking to the vehicle by driving a brake 45 to in response to a brake operation (depression of a brake pedal 43) by the driver. Further, the brake CU 40 drives the brake 45 automatically on the basis of the emergency operation signal (brake request information) output by the shift-by-wire CU 30 (the emergency determining unit 31) in order to decelerate the vehicle by applying braking to the vehicle wheel 15. At this time, the brake CU 40 illuminates a brake lamp 44 for making a following vehicle aware that braking is underway.

The brake CU 40 is constituted by a microprocessor that performs calculations, a ROM storing a program and so on for causing the microprocessor to execute various types of processing, a RAM storing various data such as calculation results, a backup RAM whose stored content is maintained by a 12 V battery, an input/output I/F, and so on. The brake CU 40 also includes a hydraulic mechanism for driving the brake 45.

A vehicle speed sensor 60 attached to the vehicle wheel 15 in order to detect a rotation speed of the vehicle wheel 15, or in other words a speed of the vehicle (a vehicle speed), is connected to the brake CU 40. A magnetic pickup or the like, for example, is preferably used as the vehicle speed sensor 60. The brake CU 40 further includes a vehicle speed detector 41 that calculates the vehicle speed on the basis of a signal detected by the vehicle speed sensor 60. Vehicle speed data calculated by the vehicle speed detector 41 are output to the shift-by-wire CU 30 via the CAN 70. Note that the vehicle speed sensor 60 may be connected to the shift-by-wire CU 30 so that the vehicle speed is read directly by the shift-by-wire CU 30. Further, the vehicle speed sensor 60 may be replaced by a configuration in which an output shaft rotation speed of the automatic transmission 10 is detected and the vehicle speed is determined from the output shaft rotation speed.

The brake 45 is driven by the brake CU 40 to apply braking to the vehicle wheel 15. In this embodiment, a disc brake is employed as the brake 45. The brake 45 includes a brake disc 46 attached to the vehicle wheel 15 of the vehicle, and a brake caliper 47 having an inbuilt brake pad and an inbuilt wheel cylinder. During braking, the brake pad is pressed against the brake disc 46 by oil pressure, thereby generating a frictional force with which braking is applied to the vehicle wheel 15 coupled to the brake disc 46. The brake CU 40 and the brake 45 function as a brake unit. Note that the brake 45 used in this embodiment is a disc brake, but a drum brake in which braking is realized by pressing a friction material against an inner peripheral surface of a drum, or the like, may be used instead.

The electric parking brake CU 50 maintains the vehicle in a stopped condition by driving a parking brake mechanism 55 in response to a driver operation (an operation to switch an electric parking brake switch 53 ON). Further, the electric parking brake CU 50 drives the parking brake mechanism 55 automatically on the basis of the emergency operation signal (brake request information) output by the shift-by-wire CU 30 (the emergency determining unit 31) in order to decelerate and stop the vehicle by applying braking to the vehicle wheel 15.

The electric parking brake CU 50 is constituted by a microprocessor that performs calculations, a ROM storing a program and so on for causing the microprocessor to execute various types of processing, a RAM storing various data such as calculation results, a backup RAM whose stored content is maintained by a 12 V battery, an input/output I/F, and so on.

The parking brake mechanism 55 is driven by the electric parking brake CU 50 to decelerate the vehicle and maintain the vehicle in the stopped condition after the vehicle is stopped. In this embodiment, an inner drum type (drum-in-disc) parking brake in which a small drum brake used as a parking brake is built into a hub is employed as the parking brake mechanism 55. Note that another type of parking brake may be used as the parking brake mechanism 55. The electric parking brake CU 50 and the parking brake mechanism 55 also function as the brake unit.

A transmission control unit (TCU) 80 responsible for shift control of the automatic transmission 10, a display 90 that displays vehicle conditions and various information, and so on are also connected to the CAN 70. The display 90 is disposed in a meter, an upper portion of a dashboard, or the like, for example, in order to indicate to the driver and/or the passenger that braking is underway when braking is applied to the vehicle on the basis of the emergency operation signal. In other words, the display 90 functions as a display. An LCD display or the like, for example, is preferably used as the display 90.

Figure 2:
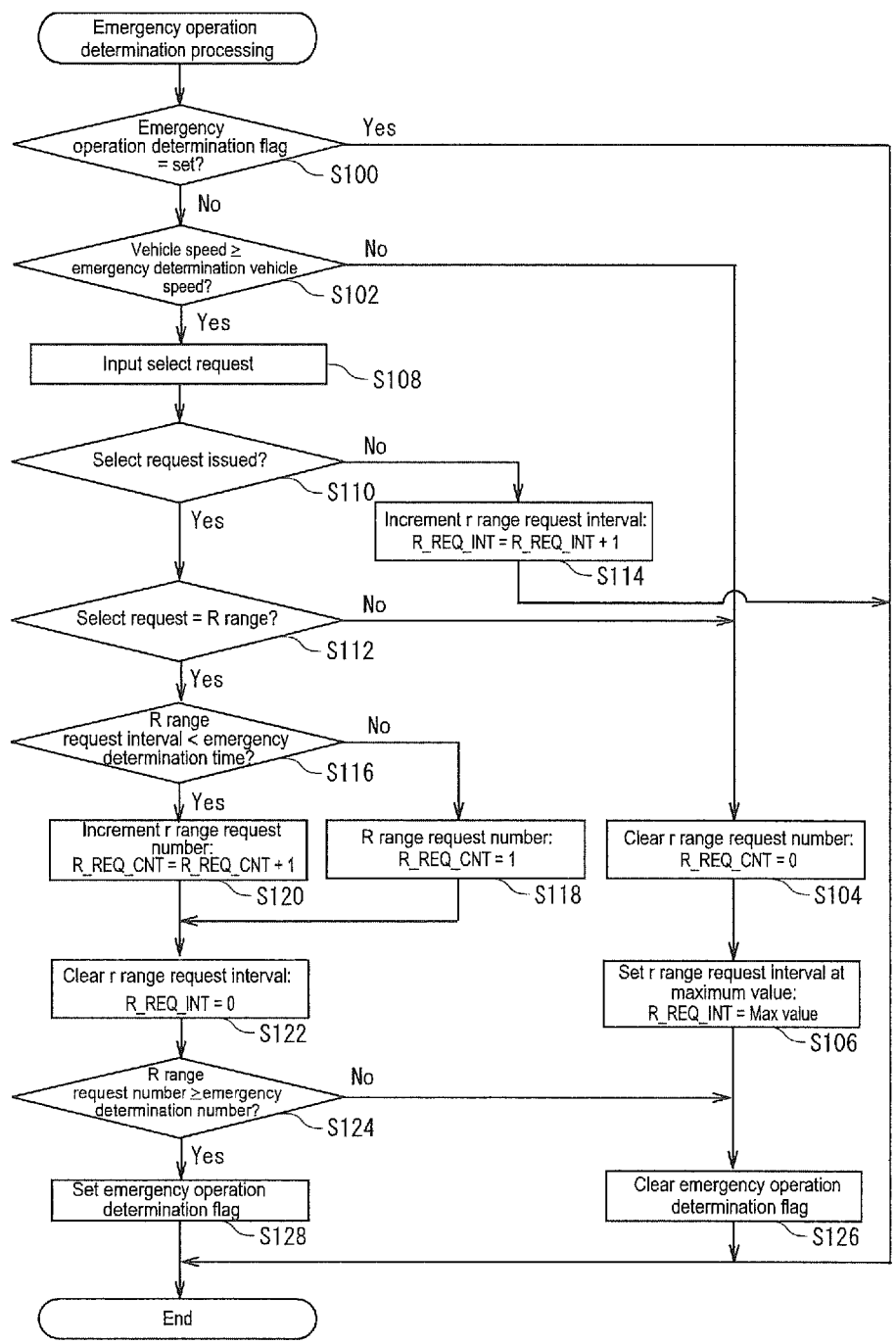
FIG. 2 is a flowchart showing procedures of emergency operation determination processing executed by the vehicle control apparatus according to this embodiment.
Figure 3:
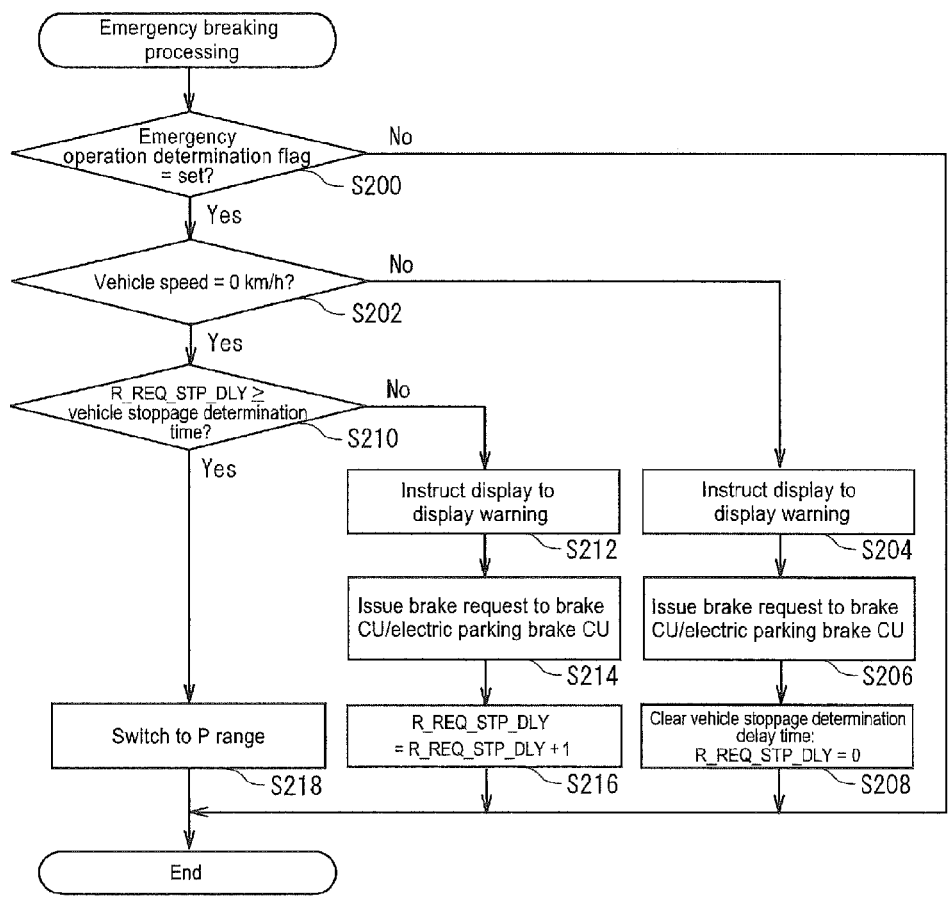
FIG. 3 is a flowchart showing procedures of emergency braking processing executed by the vehicle control apparatus according to this embodiment.

Next, referring to FIG. 2 and FIG. 3, an operation of the vehicle control apparatus 1 will be described. FIG. 2 is a flowchart showing processing procedures of emergency operation determination processing executed by the shift-by-wire CU 30 of the vehicle control apparatus 1, while FIG. 3 is a flowchart showing processing procedures of emergency braking processing executed by the shift-by-wire CU 30. This processing is executed by the shift-by-wire CU 30 repeatedly at predetermined time intervals (every 10 ms, for example).

First, referring to FIG. 2, the processing procedures of the emergency operation determination processing will be described. In step S100, a determination is made as to whether or not an emergency operation determination flag indicating whether or not an emergency operation has been performed is set (whether or not the emergency operation determination flag is at "1"). Here, when the emergency operation determination flag is already set (already at "1"), the processing is temporarily terminated. When the emergency operation determination flag is not set (at "0"), on the other hand, the processing advances to step S102.

In step S102, a determination is made as to whether or not the vehicle speed is equal to or higher than an emergency determination vehicle speed (10 km/h, for example), or in other words whether or not travel is underway. Here, when the vehicle speed is equal to or higher than the emergency determination vehicle speed, the processing advances to step S110. When the vehicle speed is lower than the emergency determination vehicle speed, on the other hand, the processing advances to step S104.

In step S104, an operation number counter (R_REQ_CNT) for counting a number of operations of the reverse switch 20b (a number of R range requests) is reset to zero. Next, in step S106, an operation interval counter (R_REQ_INT) for measuring (counting) an operation interval of the reverse switch 20b (an R range request interval) is set at a maximum value. Next, in step S126, the emergency operation determination flag is cleared, whereupon the processing is temporarily terminated.

When step S102 is affirmative, a condition of the select switch 20 (a select request input) is read in step S108. Next, in step S110, a determination is made from the condition of the select switch 20 read in step S108 as to whether or not a switch operation has been performed (whether or not a select request has been issued). When a switch operation has not been performed, the operation interval counter (R_REQ_INT) is incremented by one in step S114, whereupon the processing is temporarily terminated. When a switch operation has been performed, on the other hand, the processing advances to step S112.

In step S112, a determination is made as to whether or not the operated switch is the reverse switch 20b (whether or not the select request is for the reverse range). Here, when the operated switch is the reverse switch 20b, the processing advances to step S116. When the operated switch is not the reverse switch 20b, on the other hand, the processing advances to step S104.

As described above, in step S104, the operation number counter (R_REQ_CNT) is reset to zero. Next, in step S106, the operation interval counter (R_REQ_INT) is set at the maximum value. Next, in step S126, the emergency operation determination flag is cleared, whereupon the processing is temporarily terminated.

When step S112 is affirmative, a determination is made in step S116 as to whether or not a value of the operation interval counter (R_REQ_INT) is smaller than an emergency determination time (400 ms, for example). When the value of the operation interval counter (R_REQ_INT) is equal to or larger than the emergency determination time, the operation number counter (R_REQ_CNT) is set at one in step S118, whereupon the processing advances to step S122. When the value of the operation interval counter (R_REQ_INT) is smaller than the emergency determination time, on the other hand, the operation number counter (R_REQ_CNT) is incremented by one in step S120, whereupon the processing advances to step S122.

In step S122, the operation interval counter (R_REQ INT) is cleared. Next, in step S124, a determination is made as to whether or not a value of the operation number counter (R_REQ_CNT) is equal to or larger than an emergency determination number (five times, for example). Here, when the value of the operation number counter (R_REQ_CNT) is smaller than the emergency determination number, the emergency operation determination flag is cleared (set at "0") in step S126, whereupon the processing is temporarily terminated. When the value of the operation number counter (R_REQ_CNT) is equal to or larger than the emergency determination number, on the other hand, the emergency operation determination flag is set (set at "1") in step S128, whereupon the processing is temporarily terminated.

Hence, the emergency operation determination is performed as described above, and when an emergency operation is detected (when the reverse switch 20b is operated at least five times in two seconds), the emergency operation determination flag is set.

Next, referring to FIG. 3, the processing procedures of the emergency braking processing will be described. In step S200, a determination is made as to whether or not the emergency operation determination flag is set (whether or not the emergency operation determination flag is at "1"). Here, when the emergency operation determination flag is set (at "1"), the processing advances to step S202. When the emergency operation determination flag is not set (at "0"), on the other hand, the processing is temporarily terminated.

In step S202, a determination is made as to whether or not the vehicle speed is zero, or in other words whether or not the vehicle is stationary. Here, when the vehicle speed is not zero, the processing advances to step S204. When the vehicle speed is zero, on the other hand, the processing advances to step S210.

In step S204, control information (a display request) for outputting a warning display and a display indicating that automatic (emergency) braking is underway is output to the display 90 via the CAN 70. On the basis of the control information, the display 90 displays the warning display and the display indicating that automatic braking is underway.

Next, in step S206, the emergency operation signal (the brake request information) is output to the brake CU 40 and the electric parking brake CU 50 via the CAN 70. On the basis of the emergency operation signal (the brake request information), the brake CU 40 and the electric parking brake CU 50 respectively drive the brake 45 and the parking brake mechanism 55 to apply braking to the vehicle wheel 15. Next, in step S208, a vehicle stoppage determination counter (R_REQ_STP_DLY) that measures (counts) an elapsed time (a vehicle stoppage determination delay time) following stoppage of the vehicle is cleared, whereupon the processing is temporarily terminated.

When step S202 is affirmative (when the vehicle speed is zero), a determination is made in step S210 as to whether or not a value of the vehicle stoppage determination counter (R_REQ_STP_DLY) is equal to or larger than a vehicle stoppage determination time (one or two seconds, for example). Here, when the value of the vehicle stoppage determination counter (R_REQ_STP_DLY) is smaller than the vehicle stoppage determination time, the processing advances to step S212. When the value of the vehicle stoppage determination counter (R_REQ_STP_DLY) is equal to or larger than the vehicle stoppage determination time, on the other hand, the processing advances to step S218.

In step S212, the control information (the display request) for outputting the warning display and the display indicating that automatic (emergency) braking is underway is output to the display 90 via the CAN 70. On the basis of the control information, the display 90 displays the warning display and the display indicating that automatic braking is underway.

Next, in step S214, the emergency operation signal (the brake request information) is output to the brake CU 40 and the electric parking brake CU 50 via the CAN 70. On the basis of the emergency operation signal (the brake request information), the brake CU 40 and the electric parking brake CU 50 respectively drive the brake 45 and the parking brake mechanism 55 to apply braking to the vehicle wheel 15 (the vehicle). Next, in step S216, the vehicle stoppage determination counter (R_REQ_STP_DLY) is incremented by one, whereupon the processing is temporarily terminated.

When step S210 is affirmative, or in other words when the value of the vehicle stoppage determination counter (R_REQ_STP_DLY) is equal to or larger than the vehicle stoppage determination time, the condition of the automatic transmission 10 is switched to the parking condition (the P range) in step S218. The processing is then temporarily terminated.

As described above, when the reverse switch 20b is operated consecutively during an emergency, braking is applied to the vehicle automatically in order to stop the vehicle, whereupon the automatic transmission 10 is switched to the parking condition.

Figure 4:
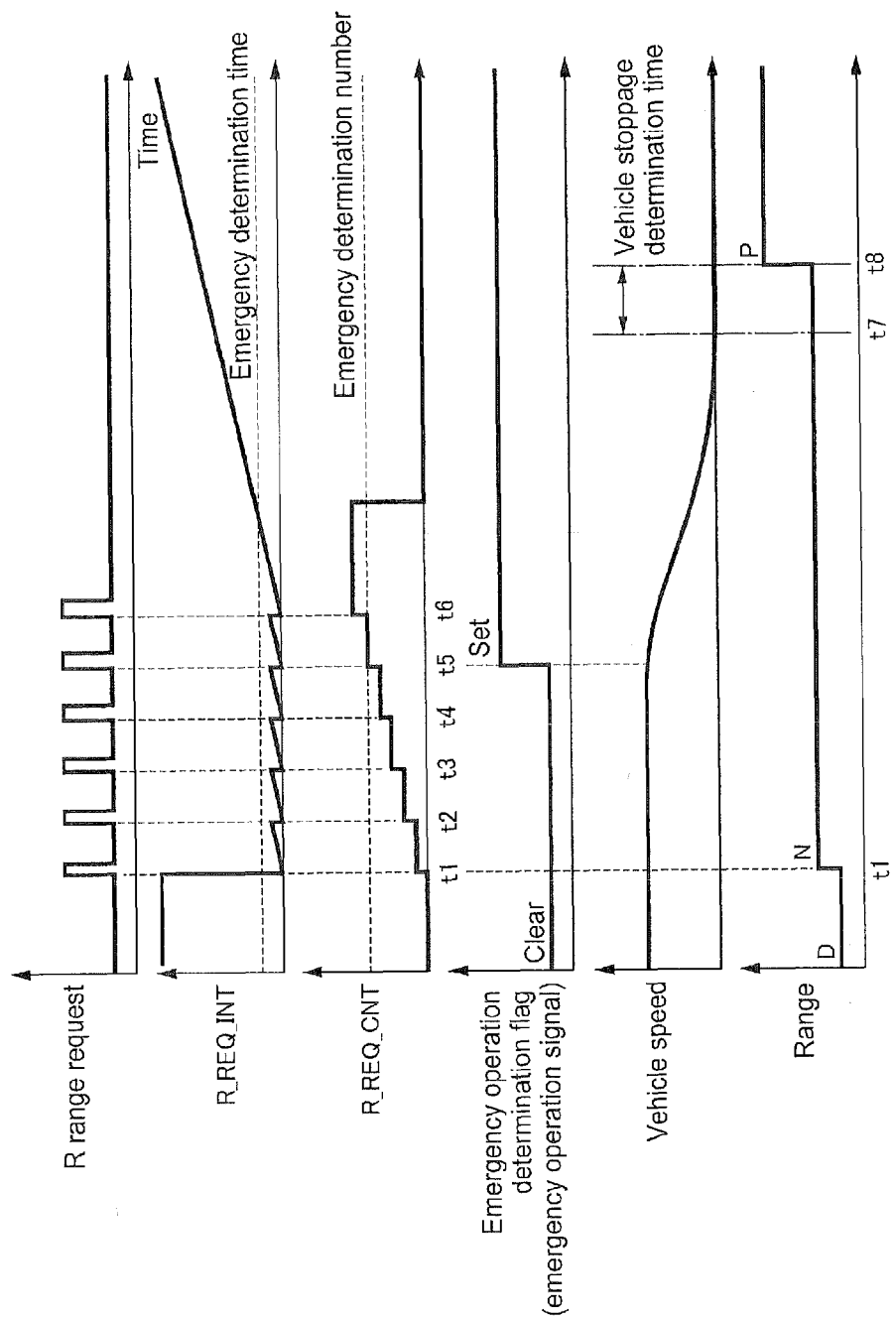
FIG. 4 is a timing chart showing a case in which a reverse switch is pressed consecutively.
Figure 5:
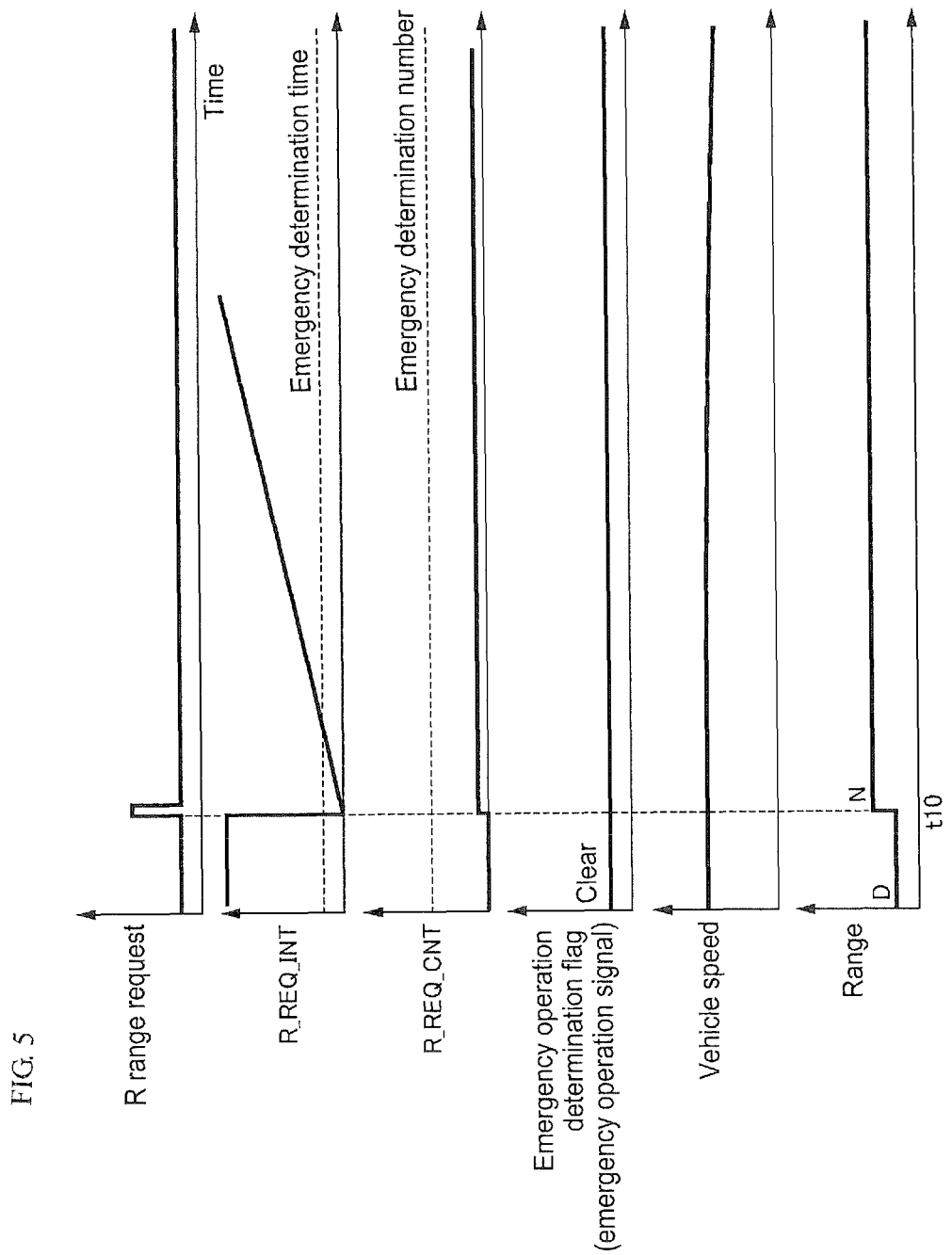
FIG. 5 is a timing chart showing a case in which the reverse switch is pressed singly.

FIG. 4 and FIG. 5 are timing charts illustrating the operation of the vehicle control apparatus 1 described above. FIG. 4 is a timing chart showing a case in which the reverse switch 20b is pressed consecutively (i.e. when an emergency operation is performed), and FIG. 5 is a timing chart showing a case (a reverse inhibit operation) in which the reverse switch 20b is pressed singly (only once).

FIG. 4 and FIG. 5 show variation in an operation signal of the reverse switch 20b (an R range request signal), the value of the operation interval counter (R_REQ_INT) for counting the operation interval of the reverse switch 20b (the R range request interval), the value of the operation number counter (R_REQ_CNT) for counting the number of operations of the reverse switch 20b (the R range request number), the condition of the emergency operation determination flag, the vehicle speed, and the condition (the range) of the automatic transmission 10, respectively, in descending order from an uppermost stage. An abscissa shows time.

First, as shown in a first stage of FIG. 4, when the reverse switch 20b is pressed consecutively one, two, three, four, five, and six times (times t1, t2, t3, t4, t5, t6), the operation interval counter (R_REQ_INT) is reset to zero every time the reverse switch 20b is pressed, whereupon the operation interval is measured by incrementing the operation interval counter (R_REQ_INT) until the reverse switch 20b is next pressed. Every time the value of the operation interval counter (R_REQ_INT) does not exceed the emergency determination time (400 ms, for example) when the reverse switch 20b is next pressed, the operation number counter (R_REQ_CNT) is counted up to 1, 2, 3, 4, 5 (the times t1, t2, t3, t4, t5, t6).

When the operation number counter (R_REQ_CNT) has been counted up five times, the emergency operation determination flag is set, as shown in a fourth stage (the time t5). As a result, brake control is executed, whereby braking is applied to the vehicle until the vehicle speed reaches zero (a time t7), as shown in a fifth stage.

When a delay time (the vehicle stoppage determination time) elapses (a time t8) after the vehicle speed reaches zero, the operating condition of the automatic transmission 10 is switched to the parking condition. Hence, when the reverse switch 20b is operated consecutively during an emergency, braking is applied to the vehicle automatically in order to stop the vehicle, whereupon the automatic transmission 10 is switched to the parking condition.

When, on the other hand, the reverse switch 20b is pressed singly (only once in the example of FIG. 5) at a time t1 during forward travel, as shown in a first stage of FIG. 5, the operation interval counter (R_REQ_INT) is reset to zero and then incremented such that the value thereof increases over time.

As shown in a third stage, the operation number counter (R_REQ_CNT) is set at one when the reverse switch 20b is pressed, and maintained at one thereafter. Note that the operation number counter (R_REQ_CNT) is reset at zero when the vehicle speed falls below 10 km/h.

Since the operation number counter (R_REQ_CNT) is maintained at one, the emergency operation determination flag is maintained in a cleared condition, as shown in a fourth stage.

As shown in a sixth stage, meanwhile, when the reverse switch 20b is pressed, reverse inhibit control is activated to switch the automatic transmission 10 to the neutral condition. Further, when the automatic transmission 10 is switched to the neutral condition, the vehicle travels through inertia such that the vehicle speed gradually decreases, as shown in a fifth stage. Hence, when the reverse switch 20b is pressed singly during forward travel, normal reverse inhibit control is executed.

According to this embodiment, as described in detail above, when the select switch 20 (the reverse switch 20b) is operated consecutively at least a predetermined number of times within a predetermined period (at least five times in two seconds, for example) during vehicle travel, the emergency operation signal (the brake request signal) is output, and braking is applied to the vehicle on the basis of the emergency operation signal. When the select switch 20 (the reverse switch 20b) is operated consecutively, therefore, an emergency can be determined, and braking can be applied to the vehicle automatically in order to stop the vehicle. As a result, the vehicle can be decelerated and stopped more quickly during an emergency. Note that according to this embodiment, normal control (inhibit control, braking control, and so on) can be performed when the select switch 20 is operated singly, for example.

Moreover, according to this embodiment, an emergency is determined when the same switch 20a to 20d is pressed consecutively. According to this embodiment in particular, an emergency is determined when the reverse switch 20b is pressed consecutively during forward travel. Hence, a desire of the driver or the passenger to decelerate/stop can be inferred, and as a result, an emergency can be determined quickly and accurately.

According to this embodiment, when the reverse switch 20b is pressed during forward travel, the condition of the automatic transmission 10 is switched to the neutral condition. Therefore, the vehicle can be decelerated and stopped safely while preventing a reduction in the durability of the automatic transmission 10 and so on.

Furthermore, according to this embodiment, when the vehicle is stopped by applying braking thereto automatically on the basis of the emergency operation signal, the condition of the automatic transmission 10 is switched to the parking condition. Therefore, unnecessary movement of the vehicle when stationary can be prevented. In other words, the vehicle can be prevented from moving even when stopped on a slope or the like, for example.

Further, according to this embodiment, a message indicating that emergency braking is underway is displayed, and therefore the driver and/or the passenger can acknowledge that the operation has been received. Moreover, the brake lamp 44 is illuminated during emergency braking (i.e. when braking is performed automatically without pressing the brake pedal 53), and therefore a following vehicle can be made aware that braking is underway. As a result, a collision with the following vehicle can be prevented.

An embodiment of the present invention was described above, but the present invention is not limited to the above embodiment and may be subjected to various modifications. For example, in the above embodiment, a case in which the reverse switch 20b is depressed during forward travel was described as an example. In another configuration, however, forward inhibit control may be executed when the drive (D) switch 20d is pressed during reverse travel, and an emergency may be determined when the drive switch 20d is pressed consecutively over a short period, whereupon processing is performed to decelerate the vehicle by driving the brake 45 and/or the parking brake mechanism 55 and to switch the automatic transmission 10 to the parking condition once the vehicle is stationary.

In the above embodiment, both the brake 45 and the parking brake mechanism 55 are used to decelerate the vehicle during an emergency, but either one thereof may be used alone.

In the above embodiment, the automatic transmission 10 is switched to the neutral (N) condition when the reverse switch 20b is pressed during forward travel, but instead, the automatic transmission 10 may be maintained in the drive (D) condition. Further, at this time, a gear ratio may be shifted to a downshift side. In so doing, an engine brake can be applied during emergency braking, and as a result, the vehicle can be decelerated and stopped more quickly.

Furthermore, a system configuration of the embodiment described above is merely an example, and the system configuration of the present invention is not limited to the above embodiment. For example, the shift-by-wire CU 30 and the shift-by-wire actuator 11 may be integrated. Further, the shift-by-wire CU 30 and the TCU 80 may be constituted by a single unit, and the brake CU 40 and the electric parking brake CU 50 may be integrated. Moreover, the shift-by-wire CU 30, the brake CU 40, and the electric parking brake CU 50 may be aggregated into a single unit. When, at this time, the aggregate unit is constituted by a single microprocessor (in other words, when there is no need to output the emergency operation signal to an external unit), the emergency operation determination flag described above, for example, functions as the emergency operation signal.

What is claimed is:

1. A vehicle control apparatus for a vehicle installed with an automatic transmission having an inhibit function, the vehicle control apparatus comprising:

an automatic return selector to receive an operation for selecting an operating condition of the automatic transmission and to output a selection signal corresponding to a received selection operation;

a switch to switch the operating condition of the automatic transmission in accordance with the selection signal output by the selector;

a determining unit to determine, based on the selection signal output by the selector, whether or not the selector has been operated consecutively at least a predetermined number of times within a predetermined period while the vehicle travels, and to output an emergency operation signal when determining that the selector has been operated consecutively; and a brake unit apply braking to the vehicle based on an operation by a driver and the emergency operation signal output by the determining unit, wherein the determining unit outputs the emergency operation signal when determining that selecting an identical operating condition, from among a plurality of ones of the operating condition that are selectable by the selector, has been performed consecutively at least the predetermined number of times within the predetermined period, and wherein the determining unit outputs the emergency operation signal when determining that selecting a reverse condition has been performed consecutively at least the predetermined number of times within the predetermined period during a forward travel.

2. The vehicle control apparatus according to claim 1, wherein, when the determining unit determines that the selector has been operated consecutively, the switch switches the automatic transmission to a neutral condition.

3. The vehicle control apparatus according to claim 1, wherein, when the determining unit determines that the selector has been operated consecutively while the vehicle travels forward, the switch maintains the automatic transmission in a forward condition.

4. The vehicle control apparatus according to claim 1, wherein, when the brake unit stops the vehicle by applying braking thereto based on the emergency operation signal, the switch switches the automatic transmission to a parking condition.

5. The vehicle control apparatus according to claim 1, further comprising a display that displays a message to the driver and/or a passenger indicating that braking is underway when the brake unit applies braking to the vehicle based on the emergency operation signal, wherein the brake unit illuminates a brake lamp when applying braking to the vehicle based on the emergency operation signal.

* * * * *